(12) United States Patent
Komatsu et al.

(10) Patent No.: US 12,182,464 B2
(45) Date of Patent: Dec. 31, 2024

(54) INFORMATION PROCESSING APPARATUS AND CONTROL METHOD OF INFORMATION PROCESSING APPARATUS

(71) Applicant: SEIKO EPSON CORPORATION, Tokyo (JP)

(72) Inventors: Masahiro Komatsu, Shiojiri (JP); Daiki Kojima, Okaya (JP); Takahiro Matsuda, Tatsuno-machi (JP); Masahide Shiozaki, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/528,831

(22) Filed: Dec. 5, 2023

(65) Prior Publication Data
US 2024/0184496 A1   Jun. 6, 2024

(30) Foreign Application Priority Data
Dec. 5, 2022   (JP) .................................. 2022-193904

(51) Int. Cl.
G06F 15/00   (2006.01)
G06F 3/12   (2006.01)

(52) U.S. Cl.
CPC ............ *G06F 3/126* (2013.01); *G06F 3/1203* (2013.01); *G06F 3/1286* (2013.01); *G06F 3/1287* (2013.01)

(58) Field of Classification Search
None
See application file for complete search history.

(56) References Cited

U.S. PATENT DOCUMENTS

| | | | |
|---|---|---|---|
| 2004/0167974 A1* | 8/2004 | Bunn | G06F 3/1232 709/223 |
| 2014/0211252 A1 | 7/2014 | Tsujimoto | |
| 2014/0211257 A1* | 7/2014 | Ishii | G06F 3/1292 358/1.15 |
| 2015/0036170 A1* | 2/2015 | Miyake | G06F 3/1238 358/1.14 |
| 2015/0153981 A1* | 6/2015 | Iwasaki | H04N 1/00344 358/1.14 |
| 2017/0359776 A1* | 12/2017 | Matsuhara | H04W 48/12 |
| 2019/0012123 A1* | 1/2019 | Takahashi | G06F 3/1238 |

FOREIGN PATENT DOCUMENTS

| | | |
|---|---|---|
| JP | 2018198347 A | 12/2018 |
| JP | 2017120654 B | 7/2019 |
| JP | 2022086624 A | 6/2022 |

* cited by examiner

*Primary Examiner* — Mark R Milia
(74) *Attorney, Agent, or Firm* — CHIP LAW GROUP (57) ABSTRACT

When an information processing apparatus having local connection to a first printing apparatus is moved from a first connection area to a third connection area, the information processing apparatus is caused to have wide area connection to the first printing apparatus in the third connection area, and when the information processing apparatus having wide area connection to a second printing apparatus is moved from the third connection area to the first connection area, a user is requested to select the first printing apparatus or the second printing apparatus, and the information processing apparatus is connected to the apparatus selected by the user in response to the request.

5 Claims, 6 Drawing Sheets

INFORMATION PROCESSING APPARATUS AND CONTROL METHOD OF INFORMATION PROCESSING APPARATUS

The present application is based on, and claims priority from JP Application Serial Number 2022-193904, filed Dec. 5, 2022, the disclosure of which is hereby incorporated by reference herein in its entirety.

BACKGROUND

1. Technical Field

The present disclosure relates to an information processing apparatus, a control method of an information processing apparatus, and a non-transitory computer-readable storage medium storing a program.

2. Related Art

In the related art, there is proposed for simplifying an operation of connecting an information processing apparatus, such as a computer or a smartphone, to a printing apparatus (see, for example, JP-A-2018-198347). In an image forming system disclosed in JP-A-2018-198347, the smartphone is connected to an image forming apparatus by a function of an application of the smartphone. In this system, the smartphone is connected to a server by receiving a beacon emitted by an access point connected to the image forming apparatus, the server transmits a command to the image forming apparatus, and the image forming apparatus executes connection processing with the smartphone.

There are various forms of connecting the information processing apparatus and the printing apparatus, and a user may connect one information processing apparatus to a plurality of printing apparatuses. Therefore, there is a large amount of information to be selected or managed by the user when the information processing apparatus is connected to the printing apparatus, and a burden on the user tends to increase.

SUMMARY

According to an aspect of the present disclosure, there is an information processing apparatus that is connected to a connection destination apparatus including a first printing apparatus and a second printing apparatus, the information processing apparatus including a communication section that executes communication with the connection destination apparatus, an area determination section that determines to which of areas the information processing apparatus belongs, the areas including a first connection area as an area in which the communication section is configured to execute communication through a first communication path and a third communication path, a second connection area as an area in which the communication section is configured to execute communication through a second communication path and the third communication path, and a third connection area as an area in which the communication section is configured not to execute communication through the first communication path and the second communication path and is configured to execute communication through the third communication path, a connection control section that controls the communication section, and a reception section that receives input, in which the connection control section determines whether or not a first condition is satisfied based on a result of the determination of the area determination section, connects the communication section to the connection destination apparatus when the first condition is satisfied, determines whether or not a second condition is satisfied when the first condition is not satisfied, and requests selection of the connection destination apparatus to connect the communication section to the connection destination apparatus specified by the input in response to the request when the second condition is satisfied.

According to another aspect of the present disclosure, there is a control method of an information processing apparatus including a communication section that executes communication with a connection destination apparatus including a first printing apparatus and a second printing apparatus, determining to which of areas the information processing apparatus belongs, the areas including a first connection area as an area in which the communication section is configured to execute communication through a first communication path and a third communication path, a second connection area as an area in which the communication section is configured to execute communication through a second communication path and the third communication path, and a third connection area as an area in which the communication section is configured not to execute communication through the first communication path and the second communication path and is configured to execute communication through the third communication path, determining whether or not a first condition is satisfied based on a result of the determination, connecting the communication section to the connection destination apparatus when the first condition is satisfied, determining whether or not a second condition is satisfied when the first condition is not satisfied, and requesting selection of the connection destination apparatus to connect the communication section to the connection destination apparatus selected in response to the request when the second condition is satisfied.

According to still another aspect of the present disclosure, there is a non-transitory computer-readable storage medium storing a program executable by a computer that controls a communication section that executes communication with a connection destination apparatus including a first printing apparatus and a second printing apparatus, the program causing the computer to function as an area determination section that determines to which of areas the communication section belongs, the areas including a first connection area as an area in which the communication section is configured to execute communication through a first communication path and a third communication path, a second connection area as an area in which the communication section is configured to execute communication through a second communication path and the third communication path, and a third connection area as an area in which the communication section is configured not to execute communication through the first communication path and the second communication path and is configured to execute communication through the third communication path, and a connection control section that determines whether or not a first condition is satisfied based on a result of the determination of the area determination section, connects the communication section to the connection destination apparatus when the first condition is satisfied, determines whether or not a second condition is satisfied when the first condition is not satisfied, and requests selection of the connection destination apparatus to connect the communication section to the connection destination apparatus selected in response to the request when the second condition is satisfied.

DESCRIPTION OF EMBODIMENTS

1. Configuration of Printing System

Embodiments of the present disclosure will be described below with reference to the drawings.

Figure 1:
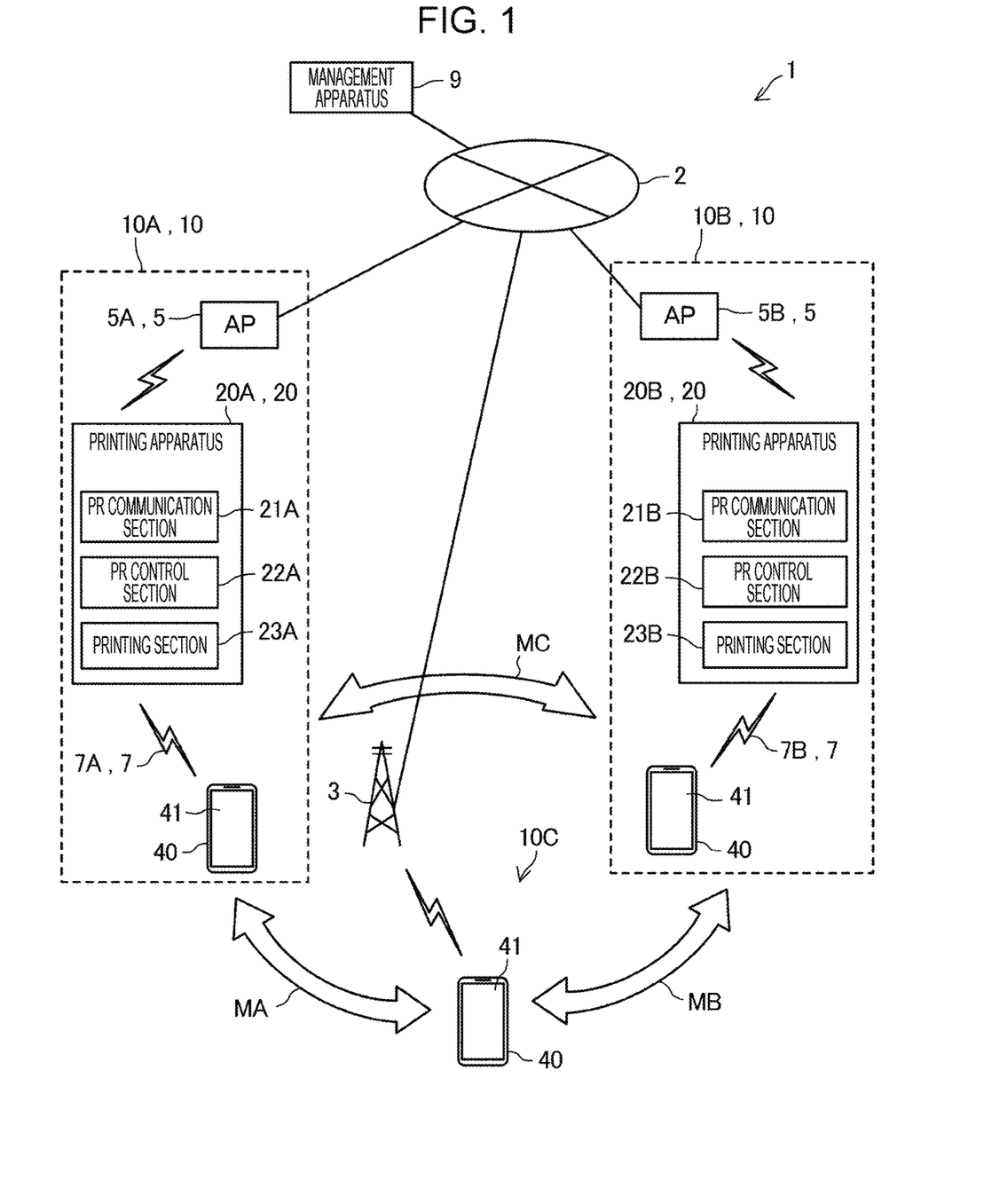
FIG. 1 is a diagram illustrating a configuration of a printing system according to an embodiment.

FIG. 1 is a diagram illustrating a configuration of a printing system 1. The printing system 1 includes a plurality of printing apparatuses 20 and a terminal apparatus 40. In the printing system 1, the terminal apparatus 40 is connected to the printing apparatus 20 through a wide area network 2 or a local network 7, and causes the printing apparatus 20 to execute printing.

The wide area network 2 is a wide area network (WAN), the Internet, and other wide area communication networks. The wide area network 2 may have a configuration including a communication line, such as a dedicated line, a public line, or a cellular communication line, or a communication device, such as a router or a gateway apparatus. For example, a base station 3 of cellular communication is connected to the wide area network 2. In addition, an access point 5 can be connected to the wide area network 2. The access point 5 is a communication device that connects the printing apparatus 20 to the wide area network 2, and is installed, for example, inside a building. The access point 5 is, for example, an optical network unit (ONU), a network router, a network switch, a Wi-Fi access point, or a Wi-Fi router. Wi-Fi is a registered trademark.

The printing apparatus 20 is an apparatus that prints an image or a character on paper or a sheet made of synthetic resin. The specific configuration of the printing apparatus 20 is not limited. For example, a printing method adopted by the printing apparatus 20 is an ink jet method, a laser method, a dot impact method, or another printing method. In addition, the printing apparatus 20 may be a multifunction machine configured integrally with an apparatus, such as a scanner. The number of the printing apparatuses 20 provided in the printing system 1 is not limited. In the present embodiment, an example will be described in which the printing system 1 includes two printing apparatuses 20A and 20B. Specific specifications of the printing apparatus 20A and the printing apparatus 20B may be the same as or different from each other.

In addition, the number of the access points 5 provided in the printing system 1 is not limited. In the present embodiment, an example will be described in which the printing system 1 includes two access points 5A and 5B. Specific specifications of the access point 5A and the access point 5B may be the same as or different from each other. The access point 5A is installed at an installation location of the printing apparatus 20A, and connects the printing apparatus 20A to the wide area network 2. The access point 5B is installed at an installation location of the printing apparatus 20B, and connects the printing apparatus 20B to the wide area network 2.

Hereinafter, when the printing apparatus 20A and the printing apparatus 20B are not distinguished from each other, the printing apparatus 20A and the printing apparatus 20B are referred to as the printing apparatus 20. Similarly, when the access point 5A and the access point 5B are not distinguished from each other, the access point 5A and the access point 5B are referred to as the access point 5, and when the local network 7A and the local network 7B are not distinguished from each other, the local network 7A and the local network 7B are referred to as the local network 7.

The printing apparatus 20 corresponds to an example of a connection destination apparatus. One of the printing apparatus 20A and the printing apparatus 20B corresponds to a first printing apparatus, and the other thereof corresponds to a second printing apparatus. In the present embodiment, for example, the printing apparatus 20A corresponds to an example of a first printing apparatus, and the local network 7A corresponds to an example of a first communication path. In addition, the printing apparatus 20B corresponds to an example of a second printing apparatus, and the local network 7B corresponds to an example of a second communication path. The wide area network 2 corresponds to an example of a third communication path.

It is not always required that the access point 5 is installed at the installation location of the printing apparatus 20. That is, the printing system 1 may include the printing apparatus 20 not connected to the wide area network 2.

The terminal apparatus 40 is a portable computer. For example, the terminal apparatus 40 is a smartphone, a tablet type computer, a laptop, or another mobile device. The terminal apparatus 40 can generate a printing job to transmit the generated printing job to the printing apparatus 20 in a state of being connected to the printing apparatus 20. The printing job transmitted by the terminal apparatus 40 includes an instruction to execute printing and data of a character or an image printed on a printing medium by the printing apparatus 20. When the printing apparatus 20 receives the printing job from the terminal apparatus 40, the printing apparatus 20 executes printing in response to the printing job. The terminal apparatus 40 corresponds to an example of an information processing apparatus.

The terminal apparatus 40 can be connected to the wide area network 2, and can execute data communication through the wide area network 2. When the printing apparatus 20 is connected to the wide area network 2, the terminal apparatus 40 is connected to the printing apparatus 20 through the wide area network 2. In this case, the terminal apparatus 40 can transmit the printing job to the printing apparatus 20 through the wide area network 2.

The terminal apparatus 40 can be connected to the printing apparatus 20 through the local network 7. The local network 7 may be, for example, a network managed by a router or the like, or a peer-to-peer type communication line that directly connects the printing apparatus 20 to the terminal apparatus 40. The local network 7 may include a wired communication path using a communication cable. The local network 7 may include Wi-Fi, Bluetooth, Zigbee, or other wireless communication paths. Bluetooth is a registered trademark. Zigbee is a registered trademark. The local network 7 may be, for example, a network using Wi-Fi direct communication.

In the present embodiment, an example will be described in which the printing apparatus 20A and the terminal apparatus 40 can be connected to each other through the local network 7A, and the printing apparatus 20B and the terminal apparatus 40 can be connected to each other through the local network 7B.

The printing system 1 includes a connection area 10A, a connection area 10B, and a connection area 10C. The connection area 10A corresponds to an example of a first connection area, the connection area 10B corresponds to an example of a second connection area, and the connection area 10C corresponds to an example of a third connection area. When the connection area 10A, the connection area 10B, and the connection area 10C are not distinguished from each other, the connection area 10A, the connection area 10B, and the connection area 10C are hereinafter referred to as a connection area 10.

The connection area 10 is an area in which the terminal apparatus 40 can be connected to the local network 7. Specifically, the connection area 10A is an area in which the terminal apparatus 40 can be connected to the printing apparatus 20A through only the local network 7A and it is required to go through a plurality of networks for the connection to the printing apparatus 20B. The connection area 10B is an area in which the terminal apparatus 40 can be connected to the printing apparatus 20B through only the local network 7B and it is required to go through a plurality of networks for the connection to the printing apparatus 20A. The connection area 10C is an area in which the terminal apparatus 40 cannot be connected to any local network 7 and it is required to go through a plurality of networks for the connection to any one of the printing apparatus 20A and the printing apparatus 20B, among the areas in which the terminal apparatus 40 can be connected to the wide area network 2. For example, the connection area 10A is inside the home of a user, the connection area 10B is inside an office normally used by the user, and the connection area 10C is inside or outside a car when the user goes out. In addition, the connection area 10 does not mean an area partitioned by a physical distance and a physical barrier. For example, even when the terminal apparatus 40 is located inside the area in which the local network 7 is installed, when the terminal apparatus 40 is not connected to the local network 7, the terminal apparatus 40 is not in the connection area 10.

Hereinafter, since the connection area 10A and the connection area 10B are areas in which the connection through the local network 7 can be executed, the connection area is referred to as a local area. On the other hand, the connection area 10C is referred to as a wide area communication area.

FIG. 1 illustrates a functional configuration of the printing apparatus 20. The printing apparatus 20A includes a PR communication section 21A, a PR control section 22A, and a printing section 23A.

The PR communication section 21A has a communication function of communicating with the access point 5 and a communication function of executing the communication through the local network 7. Specifically, the PR communication section 21A includes a transmitter that transmits a signal and a receiver that receives a signal, and communicates with an outside through an interface. The PR communication section 21A executes at least any one of wired communication through the communication cable and wireless communication, such as Wi-Fi. The interface is a cable connector in the wired communication, and is an antenna in the wireless communication. The PR communication section 21A may be configured to be connected to the access point 5 or the wide area network 2 through the cellular communication, such as long term evolution (LTE) or 5th generation mobile communication. In the present embodiment, the PR communication section 21A executes Wi-Fi communication with the access point 5, and configures the local network 7 through Wi-Fi direct connection. The PR communication section 21A executes the communication with the access point 5 and the communication through the local network 7 under the control of the PR control section 22A.

The printing section 23A includes various mechanisms (not illustrated) that execute printing on the printing medium. For example, the printing section 23A includes a printing head and a transport mechanism that transports the printing medium. The printing section 23A executes printing on the printing medium under the control of the PR control section 22A.

The PR control section 22A controls the PR communication section 21A and the printing section 23A. The PR control section 22A includes a processor (not illustrated) configured of a central processing unit (CPU), a micro processing unit (MPU), or the like. The PR control section 22A executes a predetermined control program to control each section of the printing apparatus 20A in cooperation with software and hardware. The PR control section 22A may include a memory (not illustrated) coupled to the processor. The memory is a volatile memory, and is, for example, a random access memory (RAM). In this case, the PR control section 22A transitorily stores the program executed by the processor or data processed by the processor in the memory. The PR control section 22A may include a non-volatile storage section (not illustrated). The non-volatile storage section is configured of a read only memory (ROM), a hard disk, a solid state drive (SSD), a flash memory, and the like, and stores the control program executed by the processor of the PR control section 22A. The PR control section 22A may be configured of programmable hardware.

The PR control section 22A controls the PR communication section 21A to execute the communication with the access point 5 and the communication through the local network 7A. When the PR communication section 21A is connected to the terminal apparatus 40 through the wide area network 2 or the local network 7A, the PR control section 22A receives the printing job from the terminal apparatus 40 by the PR communication section 21A. The PR control section 22A controls the printing section 23A in response to the printing job received from the terminal apparatus 40, and causes the printing section 23A to execute printing. In addition, the PR control section 22A has a printing apparatus ID which is identification information unique to the printing apparatus 20A. The PR control section 22A can transmit the printing apparatus ID of the printing apparatus 20A through the wide area network 2 or the local network 7A.

Similar to the printing apparatus 20A, the printing apparatus 20B includes a PR communication section 21B, a PR control section 22B, and a printing section 23B. The configuration of each of these sections can be the same as the configurations of the PR communication section 21A, the PR control section 22A, and the printing section 23A.

The printing system 1 may include a management apparatus 9. The management apparatus 9 is an apparatus that mediates the communication between the terminal apparatus 40 and the printing apparatus 20 through the wide area network 2. The management apparatus 9 is a server computer that is connected to the wide area network 2, and may be a plurality of server computers or a cloud server.

For example, the terminal apparatus 40 makes an inquiry to the management apparatus 9 when the terminal apparatus 40 is connected to the wide area network 2. The management apparatus 9 provides the terminal apparatus 40 with information related to the printing apparatus 20 that can be connected to the terminal apparatus 40 through the wide area network 2 in response to the inquiry from the terminal apparatus 40. The information provided by the management apparatus 9 to the terminal apparatus 40 is network information and the like for the terminal apparatus 40 to be connected to the printing apparatus 20. In addition, the management apparatus 9 may mediate the communication between the terminal apparatus 40 and the printing apparatus 20. For example, the terminal apparatus 40 transmits the printing job and the printing apparatus ID of the printing apparatus 20 that is a destination of the printing job to the management apparatus 9. In this case, the management apparatus 9 transmits the printing job transmitted by the terminal apparatus 40 to the printing apparatus 20 corresponding to the printing apparatus ID designated by the terminal apparatus 40.

Hereinafter, the direct communication between the terminal apparatus 40 and the printing apparatus 20 and the indirect communication between the terminal apparatus 40 and the printing apparatus 20 through the management apparatus 9 are not distinguished from each other, the description will be made as the communication between the terminal apparatus 40 and the printing apparatus 20 through the wide area network 2.

2. Configuration of Terminal Apparatus

Figure 2:
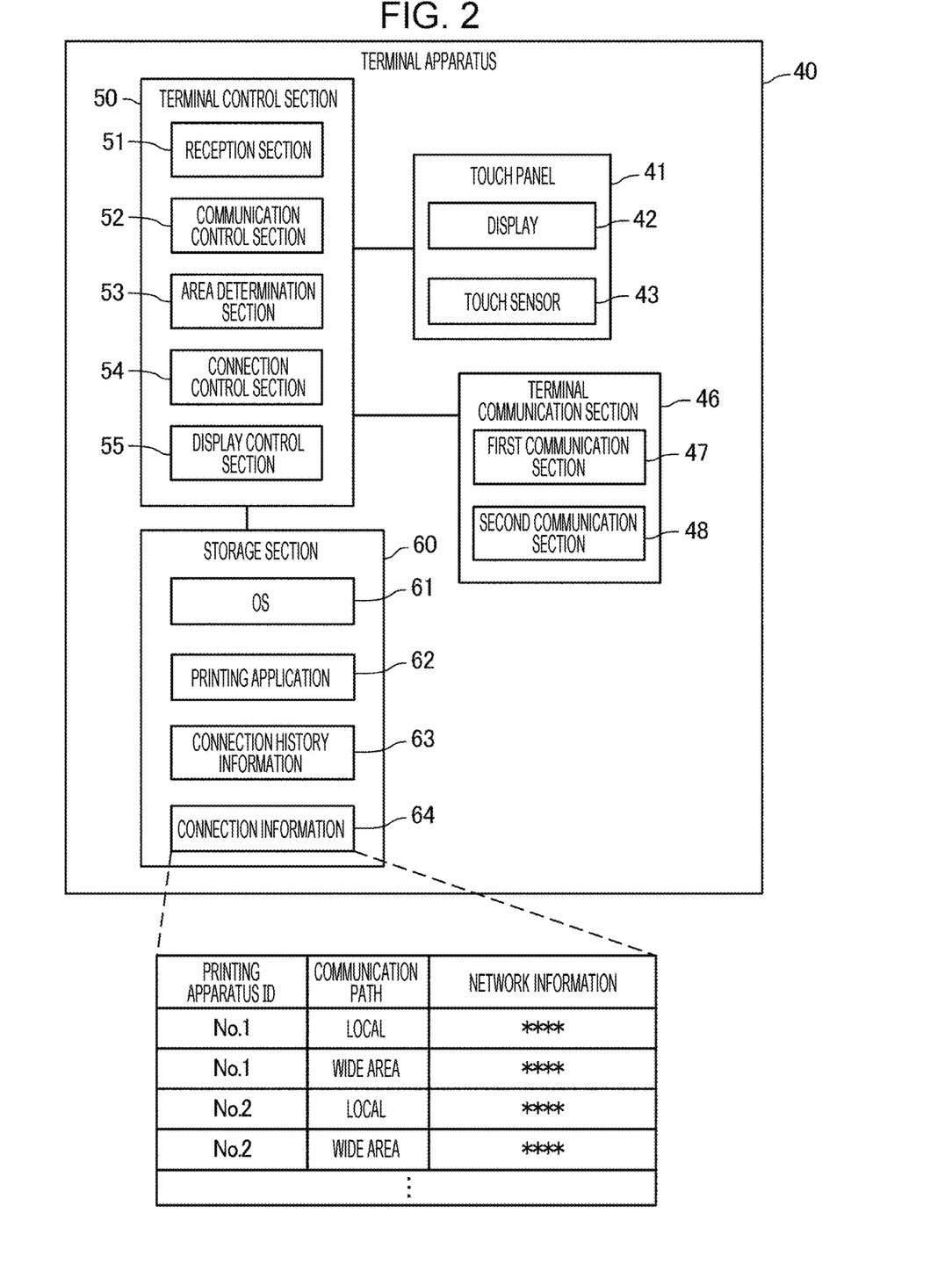
FIG. 2 is a block diagram of a terminal apparatus.

FIG. 2 is a block diagram of the terminal apparatus 40. The terminal apparatus 40 includes a terminal control section 50, and a touch panel 41, a terminal communication section 46, and a storage section 60 are coupled to the terminal control section 50.

The terminal control section 50 includes a processor, such as a CPU or a microcomputer, and controls each section of the terminal apparatus 40 by executing a control program by the processor. The terminal control section 50 may include a ROM that stores the program executed by the processor in a non-volatile manner and/or a RAM that configures a working area of the processor, or may include other peripheral circuits.

The storage section 60 is a non-volatile storage device configured of a magnetic storage device, an optical storage medium, a semiconductor memory element, and the like, and stores the program executed by the processor configuring the terminal control section 50 or various data. The storage section 60 stores, for example, an operating system (OS) 61, a printing application 62, connection history information 63, and connection information 64. The OS 61 is basic control software for controlling the terminal apparatus 40, and provides a platform on which an application program is executed. The printing application 62 is an application program for the terminal apparatus 40 to cause the printing apparatus 20 to execute printing.

The connection history information 63 is information related to a history that the terminal apparatus 40 is connected to the printing apparatus 20. The connection history information 63 includes, for example, the printing apparatus ID of the printing apparatus 20 connected to the terminal apparatus 40 in the past, and information indicating whether the communication used for the terminal apparatus 40 to be connected to the printing apparatus 20 is the wide area network 2 or the local network 7. The connection history information 63 need only include at least information related to the last connected printing apparatus 20 among the printing apparatuses 20 connected to the terminal apparatus 40 in the past. In addition, the connection history information 63 may include information related to the plurality of printing apparatuses 20 connected to the terminal apparatus 40 in the past.

The connection information 64 is information related to the printing apparatus 20 to which the terminal apparatus 40 can be connected in the printing system 1. The connection information 64 is, for example, information in which the printing apparatus ID, a communication path, and the network information are associated with each other, as illustrated in FIG. 2. The communication path indicates whether the wide area network 2 or the local network 7 is used for the connection to the printing apparatus 20. The network information includes, for example, identification information for identifying the network to which the terminal apparatus 40 is connected, authentication information used for the terminal communication section 46 to be connected to the network, and the like. The identification information is, for example, a service set identifier (SSID).

The connection information 64 includes information related to one printing apparatus 20 for each communication path. For example, as illustrated in FIG. 2, the connection information 64 separately includes information when the connection is executed through the local network 7 and information when the connection is executed through the wide area network 2, in association with No. 1 that is the printing apparatus ID of the printing apparatus 20A. For example, the connection information 64 includes connection information for the terminal apparatus 40 to be connected to the printing apparatus 20A through the wide area network 2. The connection information corresponds to an example of first wide area connection information. In addition, for example, the connection information 64 includes connection information for the terminal apparatus 40 to be connected to the printing apparatus 20A through the local network 7. The connection information corresponds to an example of first local connection information. In addition, for example, the connection information 64 includes connection information for the terminal apparatus 40 to be connected to the printing apparatus 20B through the wide area network 2. The connection information corresponds to an example of second wide area connection information. In addition, for example, the connection information 64 includes connection information for the terminal apparatus 40 to be connected to the printing apparatus 20B through the local network 7. The connection information corresponds to an example of second local connection information.

The touch panel 41 includes a display 42 and a touch sensor 43. The display 42 is a display panel, such as a liquid crystal display panel or an organic electro luminescence (EL) panel. The display 42 displays various screens including a character or an image under the control of the terminal control section 50. The touch sensor 43 detects a touch operation on the display 42. The touch sensor 43 detects an operation position when the touch operation is executed on the display 42. The touch sensor 43 outputs operation data indicating the operation position of the detected touch operation to the terminal control section 50. The display 42 can be referred to as a display section, and the touch sensor 43 can be referred to as an input section used for an input operation of the user.

The terminal communication section 46 executes the data communication through the wide area network 2 and the data communication through the local network 7. In the present embodiment, for example, a first communication section 47 and a second communication section 48 are provided. Each of the first communication section 47 and the second communication section 48 is a communication device that executes the data communication, and includes a transmitter that transmits a signal and a receiver that receives a signal.

The first communication section 47 is connected to the wide area network 2. The first communication section 47 is, for example, the communication device that executes the cellular communication with the base station 3. The second communication section 48 is connected to the local network 7. The second communication section 48 is, for example, a wireless communication device that executes the communication of Wi-Fi, Bluetooth, Zigbee, or the like, or a communication device that executes the communication through an Ethernet cable. Ethernet is a registered trademark.

The terminal control section 50 includes a reception section 51, a communication control section 52, an area determination section 53, a connection control section 54, and a display control section 55. These sections are functional sections realized by executing the printing application 62 by the processor of the terminal control section 50.

The reception section 51 receives the input by the user. The reception section 51 specifies an input content to the touch sensor 43 based on the operation data input from the touch sensor 43, and receives the specified input content.

The communication control section 52 controls the terminal communication section 46 to execute the communication through the wide area network 2 or the local network 7. In addition, the communication control section 52 executes the connection when it is detected that the second communication section 48 is a state of being connectable to the local network 7 while the second communication section 48 is not connected to the local network 7. For example, in the configuration in which the second communication section 48 executes the wireless communication, the communication control section 52 executes, by using the second communication section 48, the search for a wireless communication network to which the second communication section 48 can be connected, at a predetermined cycle, while the second communication section 48 is not connected to the local network 7. The wireless communication network to which the second communication section 48 can be connected refers to a wireless communication network that uses a frequency bandwidth in which the second communication section 48 can execute the communication or a communication protocol that can be executed by the second communication section 48. When the second communication section 48 finds the wireless communication network to which the second communication section 48 can be connected, the communication control section 52 determines whether or not the second communication section 48 can be connected to the found wireless communication network by the connection information 64. Here, the communication control section 52 connects the second communication section 48 to the found wireless communication network when the second communication section 48 can be connected.

In addition, the communication control section 52 may execute, by using the first communication section 47, the search for a wireless communication network to which the first communication section 47 can be connected at a predetermined cycle while the first communication section 47 is not connected to the wide area network 2. When the first communication section 47 finds a cellular communication network to which the first communication section 47 can be connected, the communication control section 52 connects the first communication section 47 to the found cellular communication network.

The area determination section 53 determines the connection area 10 to which the terminal apparatus 40 belongs. Specifically, the area determination section 53 determines whether the terminal apparatus 40 is in the connection area 10A, the connection area 10B, or the connection area 10C. The area determination section 53 determines the connection area 10 by, for example, whether or not the first communication section 47 is connected to the wide area network 2 and whether or not the second communication section 48 is connected to the local network 7. In this case, the area determination section 53 determines that the terminal apparatus 40 belongs to the connection area 10A when the second communication section 48 can be connected to the local network 7A, and determines that the terminal apparatus 40 belongs to the connection area 10B when the second communication section 48 can be connected to the local network 7B. In addition, the area determination section 53 determines that the terminal apparatus 40 belongs to the connection area 10C when the second communication section 48 cannot be connected to any one of the local networks 7A and 7B and the first communication section 47 can be connected to the wide area network 2.

The area determination section 53 has a function of detecting a communication state with the printing apparatus 20, and may determine the connection area 10 to which the terminal apparatus 40 belongs, based on whether or not the terminal apparatus 40 and the printing apparatus 20 can communicate with each other. Specifically, the terminal apparatus 40 tries to communicate with the printing apparatus 20 through the local network 7 or the wide area network 2, and detects whether or not it is possible to communicate with the printing apparatus 20. Examples of the case in which the terminal apparatus 40 cannot communicate with the printing apparatus 20 include a case in which the power of the printing apparatus 20 is turned off or a case in which the communication between the printing apparatus 20 and the wide area network 2 is interrupted. For example, the area determination section 53 determines that the terminal apparatus 40 belongs to the connection area 10A when the second communication section 48 is connected to the local network 7A and the communication between the printing apparatus 20A and the terminal apparatus 40 can be executed. Similarly, the area determination section 53 determines that the terminal apparatus 40 belongs to the connection area 10B when the second communication section 48 is connected to the local network 7B and the communication between the printing apparatus 20B and the terminal apparatus 40 can be executed. The fact that the terminal communication section 46 can communicate with the printing apparatus 20 does not match the fact that the terminal apparatus 40 can execute printing by the printing apparatus 20. That is, the fact that it is detected that the terminal communication section 46 can communicate with the printing apparatus 20A by the control of the area determination section 53 is different from the fact that the terminal communication section 46 is connected to the printing apparatus 20A. The same applies to the printing apparatus 20B.

The connection control section 54 controls the terminal communication section 46 to connect the terminal apparatus 40 to the printing apparatus 20. Here, connecting the terminal apparatus 40 to the printing apparatus 20 includes a transition to a state in which the terminal apparatus 40 can cause the printing apparatus 20 to execute printing.

The display control section 55 controls the display 42 to display various screens including a first selection screen 101 or a second selection screen 102 to be described below.

3. Operation of Terminal Apparatus

Figure 3:
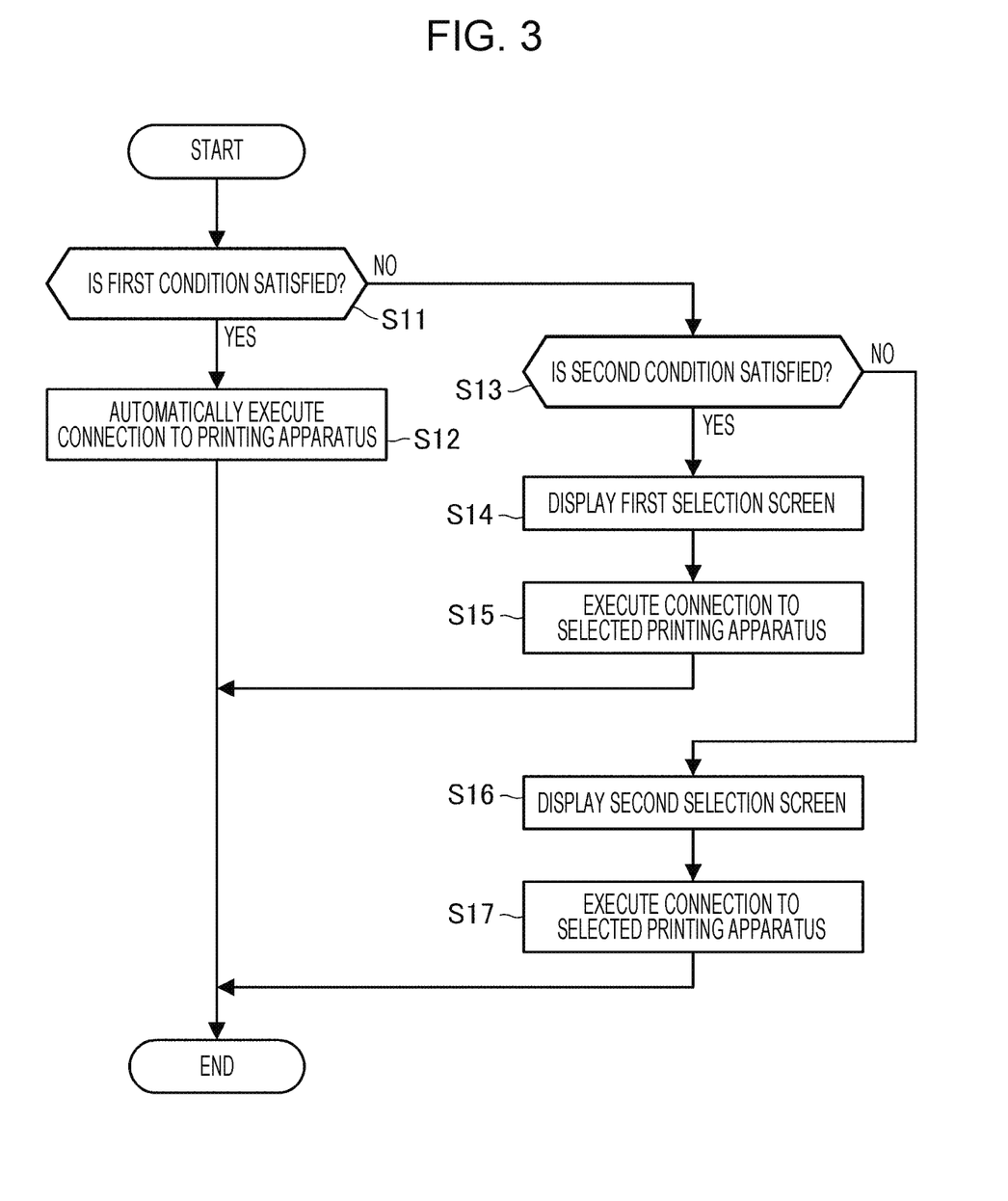
FIG. 3 is a flowchart illustrating an operation of the terminal apparatus.

FIG. 3 is a flowchart illustrating an operation of the terminal apparatus 40.

FIG. 3 illustrates the series of operations for the terminal apparatus 40 to execute the connection to the printing apparatus 20 based on a result of the determination of the area determination section 53, when a connection state between the terminal apparatus 40 and the printing apparatus 20 is changed. The operation illustrated in FIG. 3 is realized by executing the printing application 62 by the processor of the terminal control section 50. In FIG. 3, step S14 and step S16 are executed by the connection control section 54 and the display control section 55, and other steps are executed by the connection control section 54.

The case in which the connection state between the terminal apparatus 40 and the printing apparatus 20 is changed includes, for example, a case in which the terminal apparatus 40 is moved between the connection areas 10A, 10B, and 10C. As an example of the movement of the terminal apparatus 40, in FIG. 1, the movement between the connection area 10A and the connection area 10C is indicated by an arrow MA, the movement between the connection area 10B and the connection area 10C is indicated by an arrow MB, and the movement between the connection area 10A and the connection area 10B is indicated by an arrow MC. Since the terminal apparatus 40 is a portable apparatus, the connection areas 10A, 10B, and 10C can be moved.

The terminal apparatus 40 determines whether or not a first condition, which will be described below, is satisfied based on the result of the determination of the area determination section 53 (step S11). When it is determined that the first condition is satisfied (step S11; YES), the terminal apparatus 40 selects any one of the printing apparatuses 20 provided in the printing system 1 and automatically executes the connection to the selected printing apparatus 20 (step S12). The automatic execution means that the connection to the printing apparatus 20 is executed without the operation on the touch panel 41 by the user, and the terminal apparatus 40 can execute printing by using the printing apparatus 20.

When it is determined that the first condition is not satisfied (step S11; NO), the terminal apparatus 40 determines whether or not a second condition, which will be described below, is satisfied (step S13). When it is determined that the second condition is satisfied (step S13; YES), the terminal apparatus 40 displays the first selection screen on the display 42 (step S14). The first selection screen is a screen for the user to execute the operation of selecting the printing apparatus 20. The terminal apparatus 40 requests the user to select the printing apparatus 20 by displaying the first selection screen.

The terminal apparatus 40 receives the operation executed by the user in response to the display of the first selection screen. The operation is the input for selecting the printing apparatus 20. The terminal apparatus 40 is connected to the printing apparatus 20 selected by the operation of the user by the terminal communication section 46 (step S15).

When it is determined that the second condition is not satisfied (step S13; NO), the terminal apparatus 40 displays the second selection screen on the display 42 (step S16). The second selection screen is a screen for the user to execute the operation of selecting the printing apparatus 20, and includes contents different from the contents of the first selection screen. The terminal apparatus 40 requests the user to select the printing apparatus 20 by displaying the second selection screen.

The terminal apparatus 40 receives the operation executed by the user in response to the display of the second selection screen. The operation is the input for selecting the printing apparatus 20. The terminal apparatus 40 is connected to the printing apparatus 20 selected by the operation of the user by the terminal communication section 46 (step S17).

The terminal apparatus 40 can cause the printing apparatus 20 to execute printing in a state in which the terminal communication section 46 is connected to the printing apparatus 20. Then, when the connection state with the printing apparatus 20 is changed, the terminal apparatus 40 starts the operation illustrated in FIG. 3, and determines whether or not the first condition is satisfied based on the result of the determination of the area determination section 53. The terminal apparatus 40 automatically executes the connection between the terminal communication section 46 and the printing apparatus 20 when the first condition is satisfied. Then, when the first condition is not satisfied, it is determined whether or not the second condition is satisfied, and when the second condition is satisfied, the first selection screen is displayed on the display 42 to request the selection of the printing apparatus 20. Here, the terminal apparatus 40 connects the terminal communication section 46 to the printing apparatus 20 specified by the input in response to the request, that is, the input based on the first selection screen. In addition, when the second condition is not satisfied, the second selection screen is displayed to request the selection of the printing apparatus 20. The terminal communication section 46 is connected to the printing apparatus 20 specified by the input based on the second selection screen.

The first condition and the second condition are set in advance in the terminal apparatus 40, and data indicating the first condition and data indicating the second condition are stored in the storage section 60.

Examples of the first condition include the six conditions 1-A, 1-B, 1-C, 1-D, 1-E, and 1-F described below.

The condition 1-A includes that the connection area 10 to which the terminal apparatus 40 belongs is changed from the connection area 10A to the connection area 10C, and that the terminal communication section 46 is connected to the printing apparatus 20A through the local network 7A in the connection area 10A. When the condition 1-A is satisfied, in step S12, the connection control section 54 connects the terminal communication section 46 to the printing apparatus 20A through the wide area network 2.

The condition 1-B includes that the connection area 10 to which the terminal apparatus 40 belongs is changed from the connection area 10A to the connection area 10B, and that the terminal communication section 46 is connected to the printing apparatus 20A in the connection area 10A. In the condition 1-B, it does not matter whether the terminal communication section 46 is connected to the printing apparatus 20A through any one of the local network 7A and the wide area network 2 in the connection area 10A. When the condition 1-B is satisfied, in step S12, the connection control section 54 connects the terminal communication section 46 to the printing apparatus 20B.

The condition 1-C includes that the connection area 10 to which the terminal apparatus 40 belongs is changed from the connection area 10B to the connection area 10C, and that the terminal communication section 46 is connected to the printing apparatus 20B through the local network 7B in the connection area 10B. When the condition 1-C is satisfied, in step S12, the connection control section 54 connects the terminal communication section 46 to the printing apparatus 20B through the wide area network 2.

The condition 1-D includes that the connection area 10 to which the terminal apparatus 40 belongs is changed from the connection area 10B to the connection area 10A, and that the terminal communication section 46 is connected to the printing apparatus 20B in the connection area 10B. In the condition 1-D, it does not matter whether the terminal communication section 46 is connected to the printing apparatus 20A through any one of the local network 7A and the wide area network 2 in the connection area 10A. When the condition 1-D is satisfied, in step S12, the connection control section 54 connects the terminal communication section 46 to the printing apparatus 20A.

The condition 1-E includes that the connection area 10 to which the terminal apparatus 40 belongs is changed from the connection area 10C to the connection area 10A, and that the terminal communication section 46 is connected to the printing apparatus 20A through the wide area network 2 in the connection area 10C. When the condition 1-E is satisfied, in step S12, the connection control section 54 connects the terminal communication section 46 to the printing apparatus 20A through the local network 7A.

The condition 1-F includes that the connection area 10 to which the terminal apparatus 40 belongs is changed from the connection area 10C to the connection area 10B, and that the terminal communication section 46 is connected to the printing apparatus 20B through the wide area network 2 in the connection area 10C. When the condition 1-F is satisfied, in step S12, the connection control section 54 connects the terminal communication section 46 to the printing apparatus 20B through the local network 7B.

When the condition 1-A and the condition 1-C are aggregated, a condition is obtained, which includes that the terminal apparatus 40 is moved from the local area to the wide area communication area and that the terminal apparatus 40 is connected to the printing apparatus 20 through the local network 7 in the local area. When the condition is satisfied, in step S12, the terminal apparatus 40 is automatically connected to the same printing apparatus 20 as the printing apparatus 20 connected in the local area through the wide area network 2.

When the condition 1-B and the condition 1-D are aggregated, a condition is obtained, which includes that the terminal apparatus 40 is moved from the local area to the local area and that the terminal apparatus 40 is connected to the printing apparatus 20 in the local area. When the condition is satisfied, the terminal apparatus 40 is automatically connected to the printing apparatus 20 that can be connected through the local network 7 in the local area after the movement in step S12.

When the condition 1-E and the condition 1-F are aggregated, a condition is obtained, which includes that the terminal apparatus 40 is moved from the wide area communication area to the local area and that the printing apparatus 20 to which the terminal apparatus 40 is connected in the wide area communication area matches the printing apparatus 20 that can be connected in the local area after the movement. When the condition is satisfied, the terminal apparatus 40 is automatically connected, through the local network 7, to the printing apparatus 20 that can be connected through the local network 7 in the local area after the movement in step S12.

When any one of the conditions 1-A, 1-B, 1-C, 1-D, 1-E, and 1-F is satisfied, even when the terminal apparatus 40 is moved, the terminal apparatus 40 can be connected to the same printing apparatus 20 as the printing apparatus 20 connected before the movement, even after the movement. In such a case, the terminal apparatus 40 is connected to the same printing apparatus 20 without requiring the input of the user. Therefore, even when the terminal apparatus 40 is moved such that the network to be connected is changed, the user can continuously use the same printing apparatus 20 without executing the input operation.

Examples of the second condition include the three conditions 2-A, 2-B, and 2-C described below.

The condition 2-A includes that the connection area 10 to which the terminal apparatus 40 belongs is changed from the connection area 10C to the connection area 10A, and that the terminal communication section 46 is connected to the printing apparatus 20B through the wide area network 2 in the connection area 10C.

The condition 2-B includes that the connection area 10 to which the terminal apparatus 40 belongs is changed from the connection area 10C to the connection area 10B, and that the terminal communication section 46 is connected to the printing apparatus 20A through the wide area network 2 in the connection area 10C.

When the condition 2-A and the condition 2-B are aggregated, a condition is obtained, which includes that the terminal apparatus 40 is moved from the wide area communication area to the local area and that the printing apparatus 20 to which the terminal apparatus 40 is connected in the wide area communication area is different from the printing apparatus 20 that can be connected in the local area after the movement.

In addition, the condition 2-C is that an instruction to switch the printing apparatus 20 to which the terminal communication section 46 is connected is executed by the input of the user while the connection area 10 to which the terminal apparatus 40 belongs is not changed. For example, an instruction to switch the printing apparatus 20 to which the terminal communication section 46 is connected from the printing apparatus 20A to the printing apparatus 20B or to which from the printing apparatus 20B to the printing apparatus 20A is executed by the user operating the touch panel 41.

When the conditions 2-A, 2-B, and 2-C are satisfied, a case in which the user designates the printing apparatus 20 to which the terminal apparatus 40 is connected is more preferable than a case in which the terminal apparatus 40 is automatically connected to the printing apparatus 20A or the printing apparatus 20B. The reason of the above description is that there is a low possibility that the terminal apparatus 40 is connected to the printing apparatus 20 that is not intended by the user.

Figure 4:
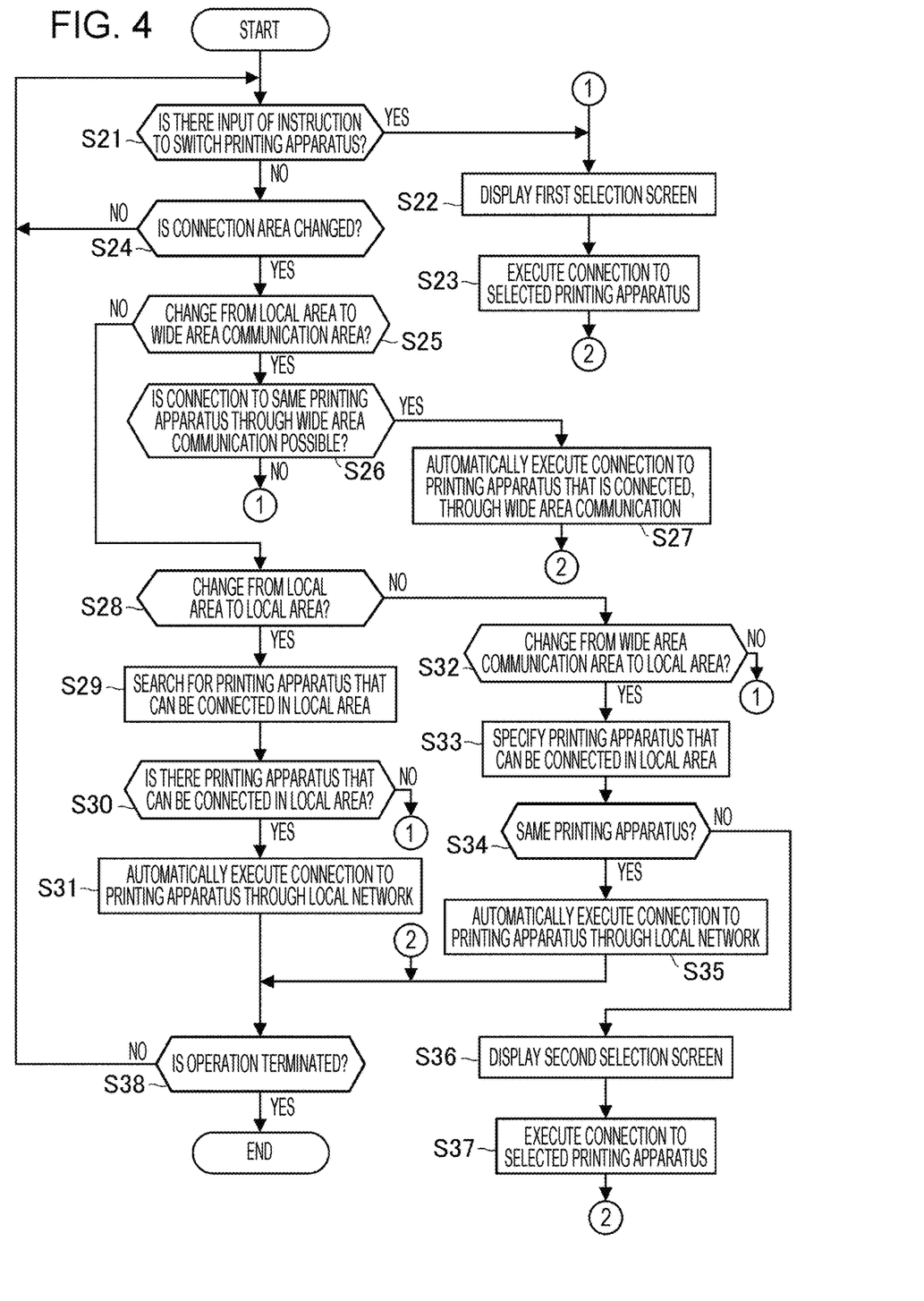
FIG. 4 is a flowchart illustrating an example of the operation of the terminal apparatus.

FIG. 4 is a flowchart illustrating an example of the operation of the terminal apparatus 40. FIG. 4 is an example of an operation by the printing application 62 in order to realize the operation based on the conditions 1-A to 1-F and the conditions 2-A to 2-C. In FIG. 4, step S22 and step S36 are executed by the connection control section 54 and the display control section 55, and other steps are executed by the connection control section 54.

The terminal apparatus 40 determines the presence or absence of the input of the instruction to switch the printing apparatus 20 connected to the terminal apparatus 40 (step S21). When it is determined that there is the input of the instruction to switch the printing apparatus 20 (step S21; YES), the terminal apparatus 40 displays the first selection screen on the display 42 (step S22). The terminal apparatus 40 receives the operation executed by the user in response to the display of the first selection screen. The operation is the input for selecting the printing apparatus 20. The terminal apparatus 40 is connected to the printing apparatus 20 selected by the operation of the user by the terminal communication section 46 (step S23), and proceeds to step S38 described below.

When there is no input of the instruction to switch the printing apparatus 20 (step S21; NO), the terminal apparatus 40 determines whether or not the connection area 10 to which the terminal apparatus 40 belongs is changed, based on the result of the determination of the area determination section 53 (step S24). When it is determined that the connection area 10 to which the terminal apparatus 40 belongs is not changed (step S24; NO), the terminal apparatus 40 returns to step S21 and repeats the determination of step S21 at a predetermined cycle.

When it is determined that the connection area 10 to which the terminal apparatus 40 belongs is changed (step S24; YES), the terminal apparatus 40 determines whether or not the change of the connection area 10 is a change from the local area to the wide area communication area (step S25). That is, it is determined whether or not there is a change from the connection area 10A or the connection area 10B to the connection area 10C.

When it is determined that the change of the connection area 10 is the change from the local area to the wide area communication area (step S25: YES), the terminal apparatus 40 determines whether or not the terminal apparatus 40 can be connected to the same printing apparatus 20 (step S26). In step S26, the terminal apparatus 40 determines whether or not the terminal apparatus 40 can be connected to the printing apparatus 20 connected before the change of the connection area 10 through the wide area network 2 after the connection area 10 is changed.

When it is determined that the terminal apparatus 40 can be connected to the same printing apparatus 20 (step S26; YES), the terminal apparatus 40 is automatically connected to the printing apparatus 20 connected before the connection area 10 is changed, through the wide area network 2 (step S27), and proceeds to step S38.

When it is determined that the terminal apparatus 40 cannot be connected to the same printing apparatus 20 (step S26; NO), the terminal apparatus 40 proceeds to step S22.

On the other hand, when it is determined that the change of the connection area 10 is not the change from the local area to the wide area communication area (step S25; NO), it is determined whether or not the change of the connection area 10 is a change from the local area to the local area (step S28). When it is determined that the change of the connection area 10 is the change from the local area to the local area (step S28; YES), the terminal apparatus 40 executes, by using the second communication section 48, the search for the printing apparatus 20 that can be connected through the local network 7 in the connection area 10 after the change (step S29). The terminal apparatus 40 determines whether or not there is the printing apparatus 20 that can be connected through the local network 7 (step S30), and proceeds to step S22 when there is no printing apparatus 20 that can be connected (step S30: NO).

When there is the printing apparatus 20 that can be connected through the local network 7 (step S30; YES), the terminal apparatus 40 is automatically connected to the printing apparatus 20 that can be connected, through the local network 7 (step S31), and proceeds to step S38.

When it is determined that the change of the connection area 10 is not the change from the local area to the local area (step S28; NO), the terminal apparatus 40 determines whether or not the change of the connection area 10 is a change from the wide area communication area to the local area (step S32).

When it is determined that the change of the connection area 10 is the change from the wide area communication area to the local area (step S32; YES), the search for the printing apparatus 20 that can be connected through the local network 7 in the connection area 10 after the change is executed by using the second communication section 48 (step S33). The terminal apparatus 40 determines whether or not the printing apparatus 20 found by the search is the same as the printing apparatus 20 connected before the connection area 10 is changed, based on, for example, the printing apparatus ID (step S34).

When it is determined that the printing apparatus 20 is the same printing apparatus 20 (step S34; YES), the terminal apparatus 40 is automatically connected to the printing apparatus 20 found by the search, through the local network 7 (step S35), and proceeds to step S38.

When it is determined that the printing apparatus 20 is not the same printing apparatus 20 (step S34; NO), the terminal apparatus 40 displays the second selection screen on the display 42 (step S36). The terminal apparatus 40 receives the operation executed by the user in response to the display of the second selection screen. The operation is the input for selecting the printing apparatus 20. The terminal apparatus 40 is connected to the printing apparatus 20 selected by the operation of the user by the terminal communication section 46 (step S37), and proceeds to step S38.

When it is determined that the change of the connection area 10 is not the change from the wide area communication area to the local area (step S32; NO), the terminal apparatus 40 proceeds to step S22. Examples of the case in which a negative determination is made in step S32 include a case in which the connection area 10 cannot be appropriately determined by the area determination section 53. In such a case, the terminal apparatus 40 enables the user to select the printing apparatus 20 by proceeding to step S22 and displaying the first selection screen.

In step S38, the terminal apparatus 40 determines whether or not to terminate the operation of the printing application 62 (step S38). When the operation is not terminated (step S38; NO), the terminal apparatus 40 returns to step S21.

In the operation of FIG. 4, steps S21 to S23 correspond to the operation when the condition 2-C is satisfied. In this case, a positive determination is made in step S21, and thus it is clear that the first condition is not satisfied.

Steps S25 to S27 correspond to the operation when the conditions 1-A and 1-C are satisfied. Steps S28 to S31 correspond to the operation when the conditions 1-B and 1-D are satisfied. Steps S32 to S35 correspond to the operation when the conditions 1-E and 1-F are satisfied. Steps S34 and S36 to S37 correspond to the operation when the conditions 2-A and 2-B are satisfied.

In addition, the operations of steps S25 to S26 in FIG. 4 include an operation when the terminal apparatus 40 is not moved. That is, when the terminal apparatus 40 is not moved and the communication with the printing apparatus 20 through the local network 7 cannot be executed in a state in which the terminal apparatus 40 is connected to the local network 7 in the connection area 10A or the connection area 10B, a positive determination is made in step S25. In this case, the terminal apparatus 40 is newly connected, through the wide area network 2, to the printing apparatus 20 connected through the local network 7. For example, when the communication with the printing apparatus 20A cannot be executed in a state in which the terminal apparatus 40 is connected to the printing apparatus 20A through the local network 7 in the connection area 10A, in step S27, the terminal apparatus 40 is connected to the printing apparatus 20A through the wide area network 2.

Figure 5:
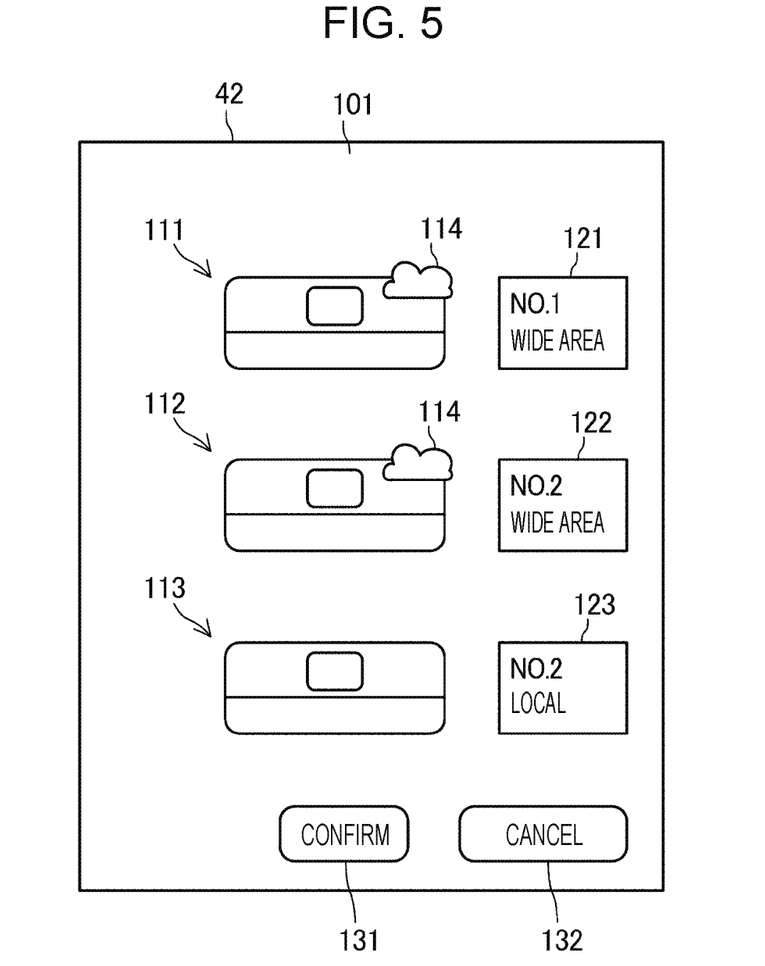
FIG. 5 is a diagram illustrating an example of display of the terminal apparatus.
Figure 6:
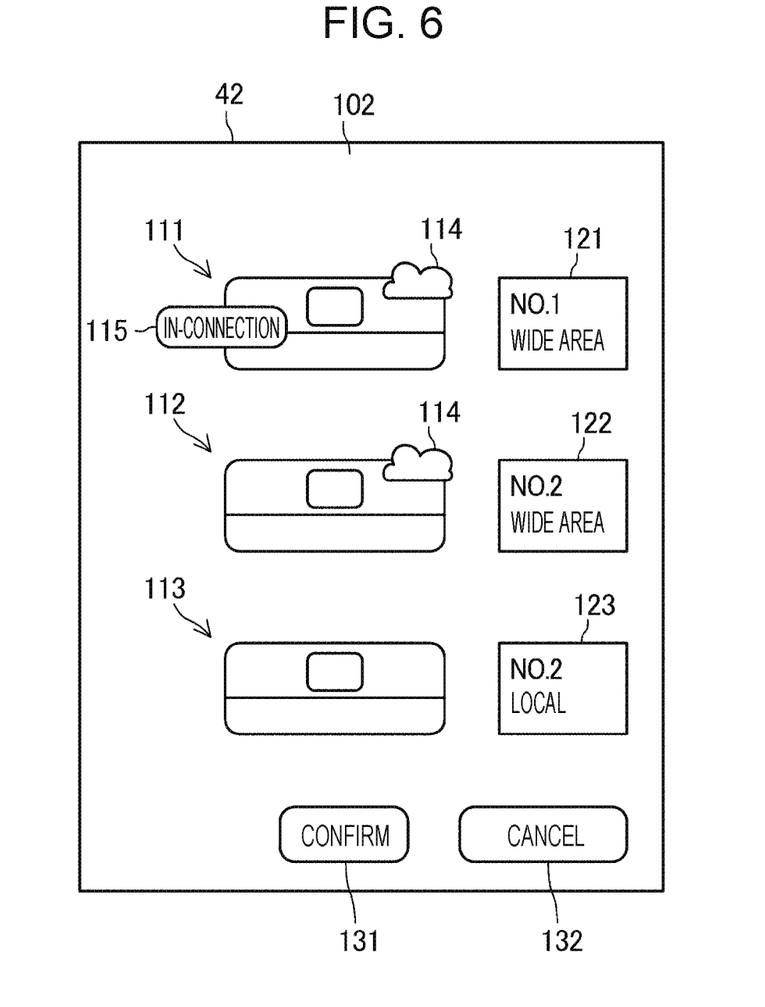
FIG. 6 is a diagram illustrating an example of display of the terminal apparatus.

FIGS. 5 and 6 are diagrams illustrating examples of display displayed on the display 42 by the terminal apparatus 40. FIG. 5 illustrates the first selection screen 101 as an example of the first selection screen displayed in step S14 (FIG. 3) and step S22 (FIG. 4). FIG. 6 illustrates the second selection screen 102 as an example of the second selection screen displayed in step S16 and step S36.

The first selection screen 101 includes printing apparatus icons 111, 112, and 113. Each of the printing apparatus icons 111, 112, and 113 indicates the printing apparatus 20 to which the terminal apparatus 40 can be connected. On the first selection screen 101, the icons 111, 112, and 113 corresponding to the printing apparatuses 20 are separately displayed for each communication path used for the connection between the terminal apparatus 40 and the printing apparatus 20. For example, on the first selection screen 101, the printing apparatus icon 112 indicating the printing apparatus 20B connected through the wide area network 2 and the printing apparatus icon 113 indicating the printing apparatus 20B connected through the local network 7B are displayed. The user can select the printing apparatus 20 and the communication path used for the connection between the printing apparatus 20 and the terminal apparatus 40 by executing the touch operation on the printing apparatus icons 111, 112, and 113.

Apparatus information 121 indicating the printing apparatus ID and the communication path is disposed side by side with the printing apparatus icon 111. Similarly, apparatus information 122 is disposed side by side with the printing apparatus icon 112, and apparatus information 123 is disposed side by side with the printing apparatus icon 113. The apparatus information 121, 122, and 123 provide information for the user to select any one of the printing apparatus icons 111, 112, and 113.

Wide area communication display 114 is added to an icon indicating the printing apparatus 20 connected through the wide area network 2 among the printing apparatus icons 111, 112, and 113.

A confirm button 131 and a cancel button 132 are disposed on the first selection screen 101. The confirm button 131 and the cancel button 132 function as buttons that receive the touch operation of the user. The cancel button 132 cancels a state in which the printing apparatus icons 111, 112, and 113 are selected by the user. The confirm button 131 confirms a state in which any one of the printing apparatus icons 111, 112, and 113 is selected by the user.

The second selection screen 102 of FIG. 6 includes the printing apparatus icons 111, 112, and 113, the apparatus information 121, 122, and 123, the confirm button 131, and the cancel button 132, which are the same as in the first selection screen 101.

In the second selection screen 102, in-connection display 115 is added to any one of the printing apparatus icons 111, 112, and 113. The in-connection display 115 indicates the printing apparatus 20 to which the terminal apparatus 40 is connected at the time of displaying the second selection screen 102. The second selection screen 102 is displayed, for example, in step S36 in a state in which the terminal apparatus 40 is connected to the printing apparatus 20 through the wide area network 2. Therefore, in order for the terminal apparatus 40 to clearly show the in-connection printing apparatus 20 to the user, the in-connection display 115 is added.

By using the first selection screen 101 and the second selection screen 102, the user can easily execute an appropriate selection from among the plurality of printing apparatuses 20 and a plurality of communication paths.

5. Other Embodiments

The embodiment described above merely describes one specific example to which the present disclosure is applied. The present disclosure is not limited to the configuration of the embodiment described above, and can be implemented in various aspects without departing from the gist of the present disclosure.

In the embodiment described above, the configuration is described in which one printing apparatus 20 is installed in each of the connection areas 10A and 10B, but this is an example. For example, the plurality of printing apparatuses 20 may be installed in the connection area 10A. In addition, the printing system 1 may include the printing apparatus 20 that cannot be connected through the local network 7 and can be connected to the terminal apparatus 40 only through the wide area network 2.

Each section illustrated in FIGS. 1 and 2 is an example, and is not particularly limited. For example, in the configuration of the terminal apparatus 40 illustrated in FIG. 2, it is not always required to install hardware corresponding to each section individually, and of course, a configuration can be adopted in which the function of each section is realized by one processor executing the program. A part of the functions realized by software may be realized by hardware, or a part of the functions realized by hardware may be realized by software. In addition, it is possible to optionally change the specific detailed configuration of each other section of each device of the terminal apparatus 40. In addition, the configuration of the terminal apparatus 40 illustrated in FIG. 2 is a main part. The terminal apparatus 40 may include a microphone that collects voice, a speaker that outputs voice, a drive circuit that drives the microphone and the speaker, a global navigation satellite system (GNSS) reception device, an acceleration sensor, a gyro sensor, and the like. The terminal apparatus 40 may have a configuration including other devices.

When the program or the control method of the information processing apparatus is realized by using the computer mounted on the terminal apparatus 40, it is also possible to configure the program to be executed by the computer in a form of a recording medium or a transmission medium for transmitting the program. A magnetic or optical recording medium or a semiconductor memory device can be used as the recording medium. Examples of the recording medium include a portable or fixed recording medium, such as a flexible disk, a hard disk drive (HDD), a CD-ROM, a DVD, a magneto-optical disk, a flash memory, or a card type recording medium. The recording medium may be a nonvolatile storage device, such as a RAM, a ROM, or an HDD, which is an internal storage device provided in a server apparatus.

The step unit of the operation illustrated in FIGS. 3 and 4 is divided depending on the main processing content in order to make it easy to understand the operation of the terminal apparatus 40, and is not limited by the division method or the name of the processing unit. The step unit may be divided into a larger number of step units depending on the processing content. One step unit may be divided to include a larger number of pieces of processing. The order of the steps may be appropriately changed.

6. Configurations Described by Embodiments

The following configurations will be described by the embodiments described above.

Configuration 1

An information processing apparatus that is connected to a connection destination apparatus including a first printing apparatus and a second printing apparatus, the information processing apparatus including a communication section that executes communication with the connection destination apparatus, an area determination section that determines to which of areas the information processing apparatus belongs, the areas including a first connection area as an area in which the communication section is configured to execute communication through a first communication path and a third communication path, a second connection area as an area in which the communication section is configured to execute communication through a second communication path and the third communication path, and a third connection area as an area in which the communication section is configured not to execute communication through the first communication path and the second communication path and is configured to execute communication through the third communication path, a connection control section that controls the communication section, and a reception section that receives input, in which the connection control section determines whether or not a first condition is satisfied based on a result of the determination of the area determination section, connects the communication section to the connection destination apparatus when the first condition is satisfied, determines whether or not a second condition is satisfied when the first condition is not satisfied, and requests selection of the connection destination apparatus to connect the communication section to the connection destination apparatus specified by the input in response to the request when the second condition is satisfied.

According to Configuration 1, in a configuration in which the information processing apparatus can be connected to a plurality of printing apparatuses in a plurality of different connection areas, it is possible to connect the information processing apparatus to an appropriate printing apparatus depending on the connection area to which the information processing apparatus belongs. As a result, it is possible to reduce a burden on a user related to the selection of the printing apparatus to which the information processing apparatus is connected or the management of the connection state of the information processing apparatus.

Configuration 2

The information processing apparatus according to Configuration 1, in which the communication section is configured to be connected to the connection destination apparatus through the first communication path that is a local area network of the first connection area, the second communication path that is a local area network of the second connection area, and the third communication path that is a wide area communication network.

According to Configuration 2, when the information processing apparatus can be connected to the printing apparatus through the local area network and the wide area communication network, it is possible to connect the information processing apparatus to an appropriate printing apparatus.

Configuration 3

The information processing apparatus according to Configuration 2, further including a storage section that stores first local connection information for the communication section to be connected to the first printing apparatus through the first communication path, first wide area connection information for the communication section to be connected to the first printing apparatus through the third communication path, second local connection information for the communication section to be connected to the second printing apparatus through the second communication path, and second wide area connection information for the communication section to be connected to the second printing apparatus through the third communication path, in which the connection control section specifies the connection destination apparatus configured to be connected by the communication section based on the information stored in the storage section.

According to Configuration 3, it is possible to connect the information processing apparatus to the printing apparatus by appropriately using the local area network and the wide area communication network.

Configuration 4

The information processing apparatus according to Configuration 1 or 2, in which the connection control section connects the communication section to the first printing apparatus through the third communication path when the communication section is connected to the first printing apparatus in the first connection area and the communication section is configured not to execute communication through the first communication path, and connects the communication section to the second printing apparatus through the third communication path when the communication section is connected to the second printing apparatus in the second connection area and the communication section is configured not to execute communication through the second communication path in the second connection area.

According to Configuration 4, even when the communication state of the information processing apparatus is changed, it is possible to continuously use the printing apparatus without change, by switching the communication path.

Configuration 5

The information processing apparatus according to any one of Configurations 1 to 4, in which the first condition includes that the area to which the information processing apparatus belongs is changed from the first connection area to the third connection area and that the communication section is connected to the first printing apparatus through the first communication path in the first connection area, and the connection control section connects the communication section to the first printing apparatus through the third communication path when the first condition is satisfied.

According to Configuration 5, it is possible to connect the information processing apparatus to the printing apparatus without requesting an operation of the user in response to the change of the communication state of the information processing apparatus, and it is possible to reduce the load on the user.

Configuration 6

The information processing apparatus according to any one of Configurations 1 to 4, in which the first condition includes that the area to which the information processing apparatus belongs is changed from the first connection area to the second connection area and that the communication section is connected to the first printing apparatus in the first connection area, and the connection control section connects the communication section to the second printing apparatus when the first condition is satisfied.

According to Configuration 6, it is possible to connect the information processing apparatus to the printing apparatus without requesting the operation of the user in response to the change of the communication state of the information processing apparatus, and it is possible to reduce the load on the user.

Configuration 7

The information processing apparatus according to any one of Configurations 1 to 4, in which the first condition includes that the area to which the information processing apparatus belongs is changed from the second connection area to the third connection area and that the communication section is connected to the second printing apparatus through the second communication path in the second connection area, and the connection control section connects the communication section to the second printing apparatus through the third communication path when the first condition is satisfied.

According to Configuration 7, it is possible to connect the information processing apparatus to the printing apparatus without requesting the operation of the user in response to the change of the communication state of the information processing apparatus, and it is possible to reduce the load on the user.

Configuration 8

The information processing apparatus according to any one of Configurations 1 to 4, in which the first condition includes that the area to which the information processing apparatus belongs is changed from the second connection area to the first connection area and that the communication section is connected to the second printing apparatus in the second connection area, and the connection control section connects the communication section to the first printing apparatus when the first condition is satisfied.

According to Configuration 8, it is possible to connect the information processing apparatus to the printing apparatus without requesting the operation of the user in response to the change of the communication state of the information processing apparatus, and it is possible to reduce the load on the user.

Configuration 9

The information processing apparatus according to any one of Configurations 1 to 4, in which the first condition includes that the area to which the information processing apparatus belongs is changed from the third connection area to the first connection area and that the communication section is connected to the first printing apparatus through the third communication path in the third connection area, and the connection control section connects the communication section to the first printing apparatus through the first communication path when the first condition is satisfied.

According to Configuration 9, it is possible to connect the information processing apparatus to the printing apparatus without requesting the operation of the user in response to the change of the communication state of the information processing apparatus, and it is possible to reduce the load on the user.

Configuration 10

The information processing apparatus according to any one of Configurations 1 to 4, in which the first condition includes that the area to which the information processing apparatus belongs is changed from the third connection area to the second connection area and that the communication section is connected to the second printing apparatus through the third communication path in the third connection area, and the connection control section connects the communication section to the second printing apparatus through the second communication path when the first condition is satisfied.

According to Configuration 10, it is possible to connect the information processing apparatus to the printing apparatus without requesting the operation of the user in response to the change of the communication state of the information processing apparatus, and it is possible to reduce the load on the user.

Configuration 11

The information processing apparatus according to any one of Configurations 1 to 10, in which the second condition includes that the area to which the information processing apparatus belongs is changed from the third connection area to the first connection area and that the communication section is connected to the second printing apparatus through the third communication path in the third connection area, and the connection control section requests selection of any one of the first printing apparatus and the second printing apparatus as the connection destination apparatus when the second condition is satisfied.

According to Configuration 11, when the plurality of printing apparatuses can be connected to the information processing apparatus, the user is requested to select the printing apparatus, and thus it is possible to connect a printing apparatus suitable for the desire of the user to the Configuration 12

The information processing apparatus according to any one of Configurations 1 to 10, in which the second condition includes that the area to which the information processing apparatus belongs is changed from the third connection area to the second connection area and that the communication section is connected to the first printing apparatus through the third communication path in the third connection area, and the connection control section requests selection of any one of the first printing apparatus and the second printing apparatus as the connection destination apparatus when the second condition is satisfied.

According to Configuration 12, when the plurality of printing apparatuses can be connected to the information processing apparatus, the user is requested to select the printing apparatus, and thus it is possible to connect the printing apparatus suitable for the desire of the user to the Configuration 13

The information processing apparatus according to any one of Configurations 1 to 10, in which the second condition includes that, while the area to which the information processing apparatus belongs is not changed, in response to the input received by the reception section, input of switching the connection destination apparatus to which the communication section is connected, from the first printing apparatus to the second printing apparatus or input of switching from the second printing apparatus to the first printing apparatus is received, and the connection control section requests selection of any one of the first communication path and the third communication path or selection of any one of the second communication path and the third communication path as a communication path communicating with the connection destination apparatus when the second condition is satisfied.

According to Configuration 13, it is possible to connect the printing apparatus suitable for the desire of the user to the information processing apparatus in response to the selection of the user.

Configuration 14

A control method of an information processing apparatus including a communication section that executes communication with a connection destination apparatus including a first printing apparatus and a second printing apparatus, determining to which of areas the information processing apparatus belongs, the areas including a first connection area as an area in which the communication section is configured to execute communication through a first communication path and a third communication path, a second connection area as an area in which the communication section is configured to execute communication through a second communication path and the third communication path, and a third connection area as an area in which the communication section is configured not to execute communication through the first communication path and the second communication path and is configured to execute communication through the third communication path, determining whether or not a first condition is satisfied based on a result of the determination, connecting the communication section to the connection destination apparatus when the first condition is satisfied, determining whether or not a second condition is satisfied when the first condition is not satisfied, and requesting selection of the connection destination apparatus to connect the communication section to the connection destination apparatus selected in response to the request when the second condition is satisfied.

According to Configuration 14, in a configuration in which the information processing apparatus can be connected to the connection destination apparatus in a plurality of different connection areas, it is possible to connect the information processing apparatus to an appropriate connection destination apparatus depending on the connection area to which the information processing apparatus belongs. As a result, it is possible to reduce the burden on the user related to the selection of the apparatus to which the information processing apparatus is connected or the management of the connection state of the information processing apparatus.

Configuration 15

A non-transitory computer-readable storage medium storing a program executable by a computer that controls a communication section that executes communication with a connection destination apparatus including a first printing apparatus and a second printing apparatus, the program causing the computer to function as an area determination section that determines to which of areas the communication section belongs, the areas including a first connection area as an area in which the communication section is configured to execute communication through a first communication path and a third communication path, a second connection area as an area in which the communication section is configured to execute communication through a second communication path and the third communication path, and a third connection area as an area in which the communication section is configured not to execute communication through the first communication path and the second communication path and is configured to execute communication through the third communication path, and a connection control section that determines whether or not a first condition is satisfied based on a result of the determination of the area determination section, connects the communication section to the connection destination apparatus when the first condition is satisfied, determines whether or not a second condition is satisfied when the first condition is not satisfied, and requests selection of the connection destination apparatus to connect the communication section to the connection destination apparatus selected in response to the request when the second condition is satisfied.

According to Configuration 15, in the configuration in which the information processing apparatus can be connected to the connection destination apparatus in a plurality of different connection areas, it is possible to connect the information processing apparatus to an appropriate connection destination apparatus depending on the connection area to which the information processing apparatus belongs. As a result, it is possible to reduce the burden on the user related to the selection of the apparatus to which the information processing apparatus is connected or the management of the connection state of the information processing apparatus.

What is claimed is:

1. An information processing apparatus, comprising:
   an interface configured to provide a communication with an outside; and
   a processor configured to:
     determine a plurality of areas to which the information processing apparatus belongs, wherein
       the plurality of areas includes a first connection area in which the information processing apparatus is configured to have a local connection to a first printing apparatus, wherein
         in the first connection area, the information processing apparatus is configured not to have a local connection to a second printing apparatus, and
         the information processing apparatus is configured to have a wide area connection to the second printing apparatus, and
       the plurality of areas further includes a third connection area in which the information processing apparatus is configured not to have the local connection to the first printing apparatus and the local connection to the second printing apparatus, and the information processing apparatus is configured to have a wide area connection to the first printing apparatus and the wide area connection to the second printing apparatus,
     wherein when the information processing apparatus having the local connection to the first printing apparatus is moved from the first connection area to the third connection area, the information processing apparatus is configured to have the wide area connection to the first printing apparatus in the third connection area, and
     wherein when the information processing apparatus having the wide area connection to the second printing apparatus is moved from the third connection area to the first connection area, the information processing device is configured to:
       request a user to select one of the first printing apparatus or the second printing apparatus, and connect the information processing apparatus to one of the selected first printing apparatus or the selected second printing apparatus.

2. The information processing apparatus according to claim 1, wherein
   the processor is further configured to cause the information processing apparatus to have the local connection to the first printing apparatus, in response to the selection of the first printing apparatus by the user when the information processing apparatus having the wide area connection to the second printing apparatus is moved from the third connection area to the first connection area.

3. The information processing apparatus according to claim 1, wherein
   when the information processing apparatus is connected to the first printing apparatus, the processor is further configured to:
     transmit a printing job to the first printing apparatus; and
     execute the printing job via the first printing apparatus, and
   when the information processing apparatus is connected to the second printing apparatus, the processor is further configured to:
     transmit the printing job to the second printing apparatus; and execute the printing job via the second printing apparatus.

4. A control method of an information processing apparatus, the control method comprising:
- determining plurality of areas to which the information processing apparatus belongs, wherein
  - the plurality of areas includes a first connection area in which the information processing apparatus is configured to have a local connection to a first printing apparatus, wherein
    - in the first connection area, the information processing apparatus is configured not to have a local connection to a second printing apparatus, and
    - the information processing apparatus is configured to have a wide area connection to the second printing apparatus, and
  - the plurality of areas further includes a third connection area in which the information processing apparatus is configured not to have the local connection to the first printing apparatus and the local connection to the second printing apparatus, and the information processing apparatus is configured to have a wide area connection to the first printing apparatus and the wide area connection to the second printing apparatus; and
- causing the information processing apparatus to have the wide area connection to the first printing apparatus in the third connection area, when the information processing apparatus having the local connection to the first printing apparatus is moved from the first connection area to the third connection area, wherein;
- when the information processing apparatus having the wide area connection to the second printing apparatus is moved from the third connection area to the first connection area, the control method further comprises:
  - requesting a user to select one of the first printing apparatus or the second printing apparatus, and
  - connecting the information processing apparatus to one of the selected first printing apparatus or the selected second printing apparatus.

5. A non-transitory computer-readable storage medium having stored thereon computer-executable instructions which when executed by a computer, cause the computer to execute operations, the operations comprising:
- determine a plurality of areas to which the computer belongs, wherein
  - the plurality of areas includes a first connection area in which the computer is configured to have a local connection to a first printing apparatus, wherein
    - in the first connection area, the computer is configured not to have a local connection to a second printing apparatus, and
    - the computer is configured to have a wide area connection to the second printing apparatus, and
  - the plurality of areas further includes a third connection area in which the computer is configured not to have the local connection to the first printing apparatus and the local connection to the second printing apparatus, and the computer is configured to have a wide area connection to the first printing apparatus and the wide area connection to the second printing apparatus, wherein
  - when the computer having the local connection to the first printing apparatus is moved from the first connection area to the third connection area, the computer is configured to have the wide area connection to the first printing apparatus in the third connection area,
  - when the computer having the wide area connection to the second printing apparatus is moved from the third connection area to the first connection area, the computer is configured to:
    - request a user to select one of the first printing apparatus or the second printing apparatus, and
    - connect the computer to one of the selected first printing apparatus or the selected second printing apparatus.

* * * * *